(12) United States Patent
Nebel et al.

(10) Patent No.: US 8,087,691 B2
(45) Date of Patent: Jan. 3, 2012

(54) STEERING WHEEL UNIT

(75) Inventors: Raimund Nebel, Obermeitingen (DE);
Remi Baillivet, Dampierre-en-Bray
(FR); David Palm, Davisburg, MI (US);
Yutaka Tsuchida, Ibaraki (JP); **Akira
Ueki, Kanagawa (JP); Richard
Lawrence Matsu**, Plymouth, MI (US);
Jean-Bernard Tessier, Poitiers (FR)

(73) Assignee: Autoliv Development AB, Vargarda (SE)

( * ) Notice: Subject to any disclaimer, the term of this
patent is extended or adjusted under 35
U.S.C. 154(b) by 0 days.

(21) Appl. No.: 12/997,635

(22) PCT Filed: Feb. 3, 2009

(86) PCT No.: PCT/EP2009/000695
§ 371 (c)(1),
(2), (4) Date: Dec. 13, 2010

(87) PCT Pub. No.: WO2009/149776
PCT Pub. Date: Dec. 17, 2009

(65) Prior Publication Data
US 2011/0089672 A1 Apr. 21, 2011

(30) Foreign Application Priority Data
Jun. 13, 2008 (DE) .......................... 10 2008 028 126

(51) Int. Cl.
*B60R 21/203* (2006.01)
(52) U.S. Cl. .................. 280/731; 280/728.2; 200/61.55
(58) Field of Classification Search .................. 280/731,
280/728.2; 200/61.55, 61.56, 61.57
See application file for complete search history.

(56) References Cited

U.S. PATENT DOCUMENTS

| | | | | |
|---|---|---|---|---|
| 5,228,362 A * | 7/1993 | Chen et al. | ...................... | 74/552 |
| 6,675,675 B1 * | 1/2004 | Sauer et al. | ...................... | 74/552 |
| 6,953,204 B2 * | 10/2005 | Xu et al. | ...................... | 280/731 |
| 7,357,409 B2 * | 4/2008 | Frisch | ......................... | 280/728.3 |
| 7,533,897 B1 * | 5/2009 | Xu et al. | ..................... | 280/728.2 |

(Continued)

FOREIGN PATENT DOCUMENTS

DE 199 27 032 A1 12/2000

(Continued)

OTHER PUBLICATIONS

PCT/EP2009/000695—International Search Report—May 7, 2009.

*Primary Examiner* — Drew Brown
(74) *Attorney, Agent, or Firm* — Brinks Hofer Gilson & Lione

(57) ABSTRACT

A steering wheel unit for a motor vehicle. The steering wheel unit has a steering wheel and an airbag module (30) located in the hub area of the steering wheel. This airbag module forms a housing (32), an airbag (52) folded into the housing, and a gas generator (54). The airbag module can be pushed down against the force of at least one spring element to activate a horn, whereby positioning means are present which define the position of the airbag module in relation to the steering wheel. In order to achieve a high degree of operational reliability and a very exact positioning of the airbag module in the steering wheel, at least one retaining means (28;38,68) is present which acts between the airbag module and the steering wheel (28;38,68). This retaining means is ineffective in the absence of outer forces and when the airbag module (30) is pressed down to activate a horn.

20 Claims, 10 Drawing Sheets

U.S. PATENT DOCUMENTS

| | | | |
|---|---|---|---|
| 7,547,042 B2 * | 6/2009 | Chapelain et al. | 280/731 |
| 7,823,908 B2 * | 11/2010 | Matsu et al. | 280/728.2 |
| 2004/0135351 A1 * | 7/2004 | Keutz et al. | 280/728.2 |
| 2005/0012310 A1 * | 1/2005 | Rhea | 280/731 |
| 2008/0012270 A1 * | 1/2008 | Weigand et al. | 280/728.2 |

FOREIGN PATENT DOCUMENTS

| | | |
|---|---|---|
| DE | 10 2006 037 672 A1 | 2/2008 |
| GB | 2 390 337 A | 1/2004 |
| WO | WO 2007/067122 A1 | 6/2007 |

* cited by examiner

US 8,087,691 B2

STEERING WHEEL UNIT

CROSS REFERENCE TO RELATED APPLICATIONS

This application claims priority to German Patent Application No. 10 2008 028 126.3, filed Jun. 13, 2008 and PCT/EP2009/000695, filed Feb. 3, 2009.

TECHNICAL FIELD OF THE INVENTION

The invention relates to a steering wheel unit for motor vehicle having an airbag module incorporated into the steering wheel unit.

BACKGROUND OF THE INVENTION

An airbag module is accommodated within the hub area of the steering wheel of almost every modern motor vehicle. The module has a housing, an inflation device—mostly in the form of a gas generator—and an airbag. The airbag is folded inside the housing and is spanned by a cover element which closes the housing. The cover element often also serves as the operating surface for the horn. In this case, the cover element can be pressed down against the steering wheel against the force of at least one spring element. Two basic designs are known of this type of system.

On the one hand, it is possible to connect the housing with the steering wheel in a fixed fashion and to arrange the cover element on the housing or the steering wheel so as to be moveable in axial direction.

Furthermore, it is possible to arrange the entire module, in other words the subassembly consisting of housing, gas generator, airbag and cover element, on the steering wheel so as to be moveable in axial direction. Such a design is known, for example, from patent application DE 196 25 722 A1. In that reference, compression springs are provided between the housing floor and the steering wheel, which push the housing away in the axial direction (related to the steering column). Positioning means which function in the axial direction are present, which limit the movement caused by the springs and define the axial position of the airbag module in the absence of forces from the outside. This means that—with the exception of when the horn is being operated—axial force is permanently transmitted between the airbag module and the steering wheel.

In addition to the requirement for a very high level of functional reliability, the requirement that the positioning of the airbag module in the steering wheel should be very precise for aesthetic reasons is playing an increasingly important role.

SUMMARY OF THE INVENTION

The present invention therefore sets the task of improving a steering wheel unit of the generic type in such a way that in addition to a very high level of operational reliability, very exact positioning of the airbag module in the steering wheel can be achieved.

According to the invention, in addition to at least one positioning means which defines the axial position of the airbag module in relation to the steering wheel in the absence of an outside force, there is at least one retaining means acting between the airbag module and the steering wheel, which is ineffective in the absence of outside forces and when the airbag module is pressed down, in other words, which does not transfer any forces between the airbag module and the steering wheel when in these states.

When the gas generator is ignited, very high forces can take effect between the airbag module and the steering wheel. In steering wheel units of the generic prior art type, the positioning means were designed so as to be correspondingly robust, so that they also ensured that the airbag module remained connected to the airbag if the gas generator was ignited. It was frequently necessary to provide strengthening elements for this purpose, in particular made of metal. However, this leads to a tolerance chain, which again has a negative effect on the exact positioning or which considerably increases the time and expense needed for production.

This problem is solved by means of the additional retaining means. As, in normal operating states, these means do not have any effect, the requirements as regards exact dimensioning are low. On the other hand, because of the presence of the retaining means, requirements regarding the axial positioning means are low as regards their robustness. Because of the distribution of tasks, it is not necessary to make compromises with regard to the design of the retaining means and the positioning means.

A further advantage of the concept according to the invention is that it permits improved mounting and removal capability, as will be seen later in the descriptions of the preferred embodiments.

Preferred embodiments of the invention result from the subclaims and also from the embodiments now to be described with reference to the Figures. The Figures are as follows:

DETAILED DESCRIPTION OF THE PREFERRED EMBODIMENTS

Figure 1:
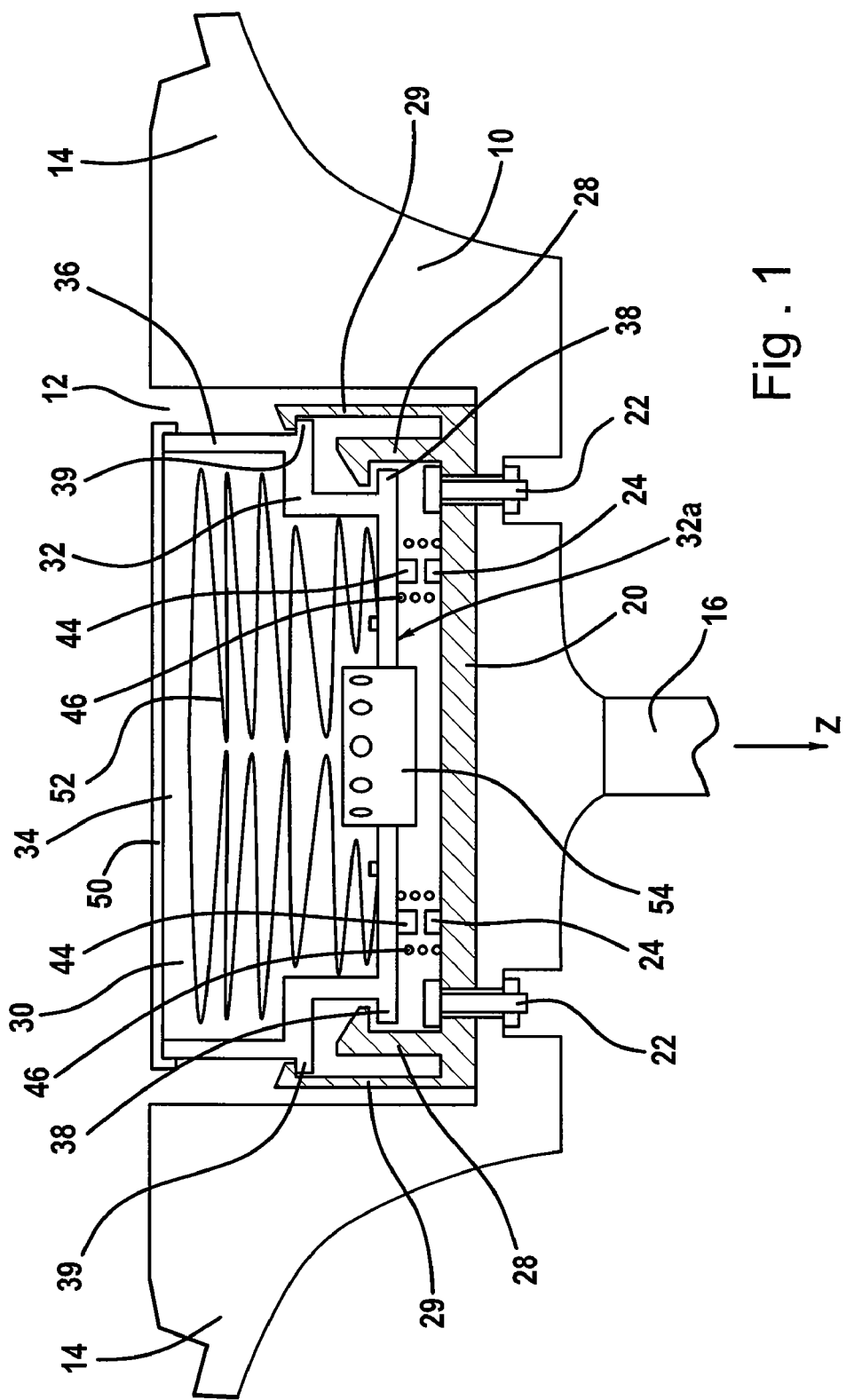
FIG. 1 is a strongly schematised cross-section through the hub area of a steering wheel, in which an airbag module is accommodated.
Figure 2:
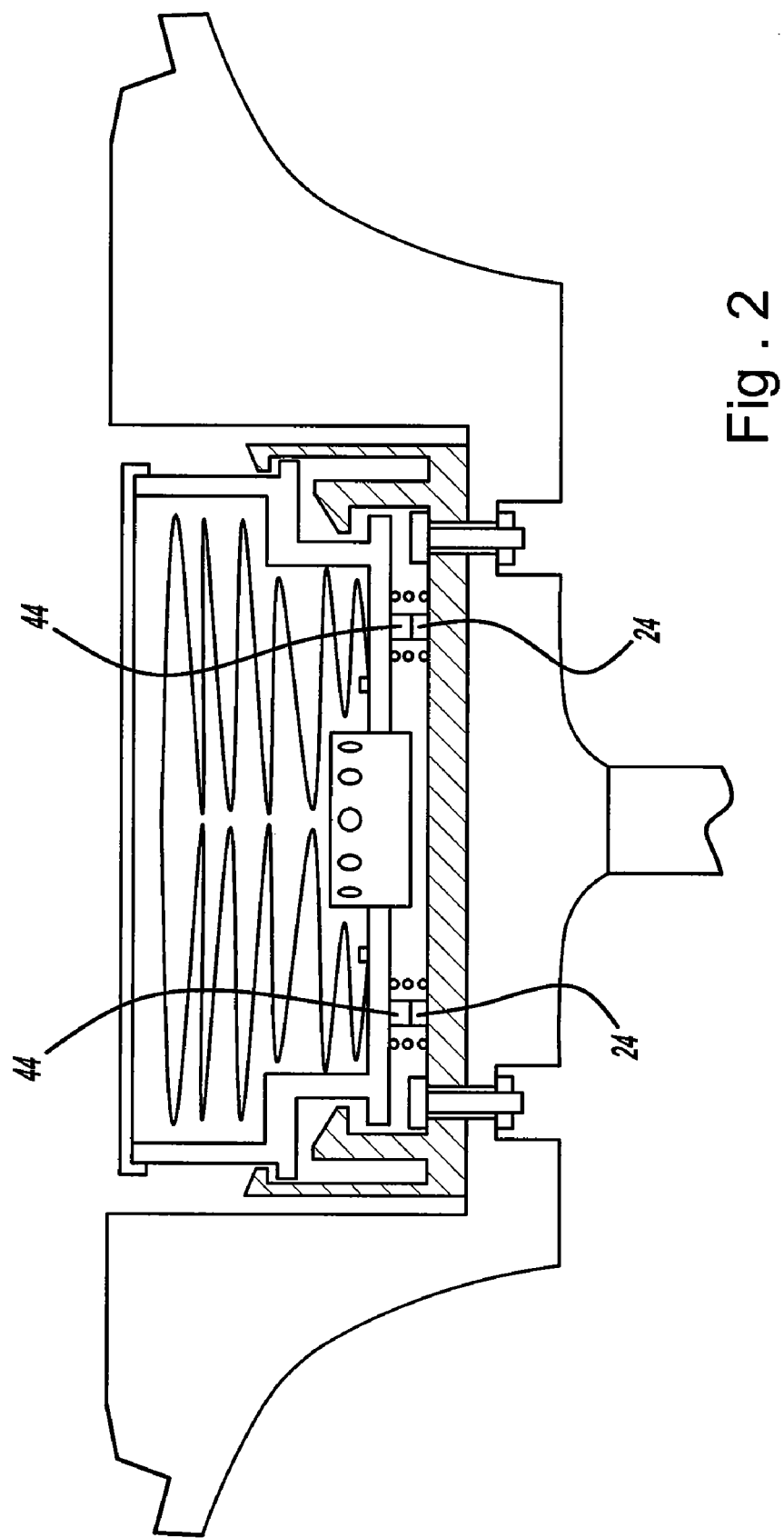
FIG. 2 shows the items shown in FIG. 1 with the airbag module pressed down.
Figure 3:
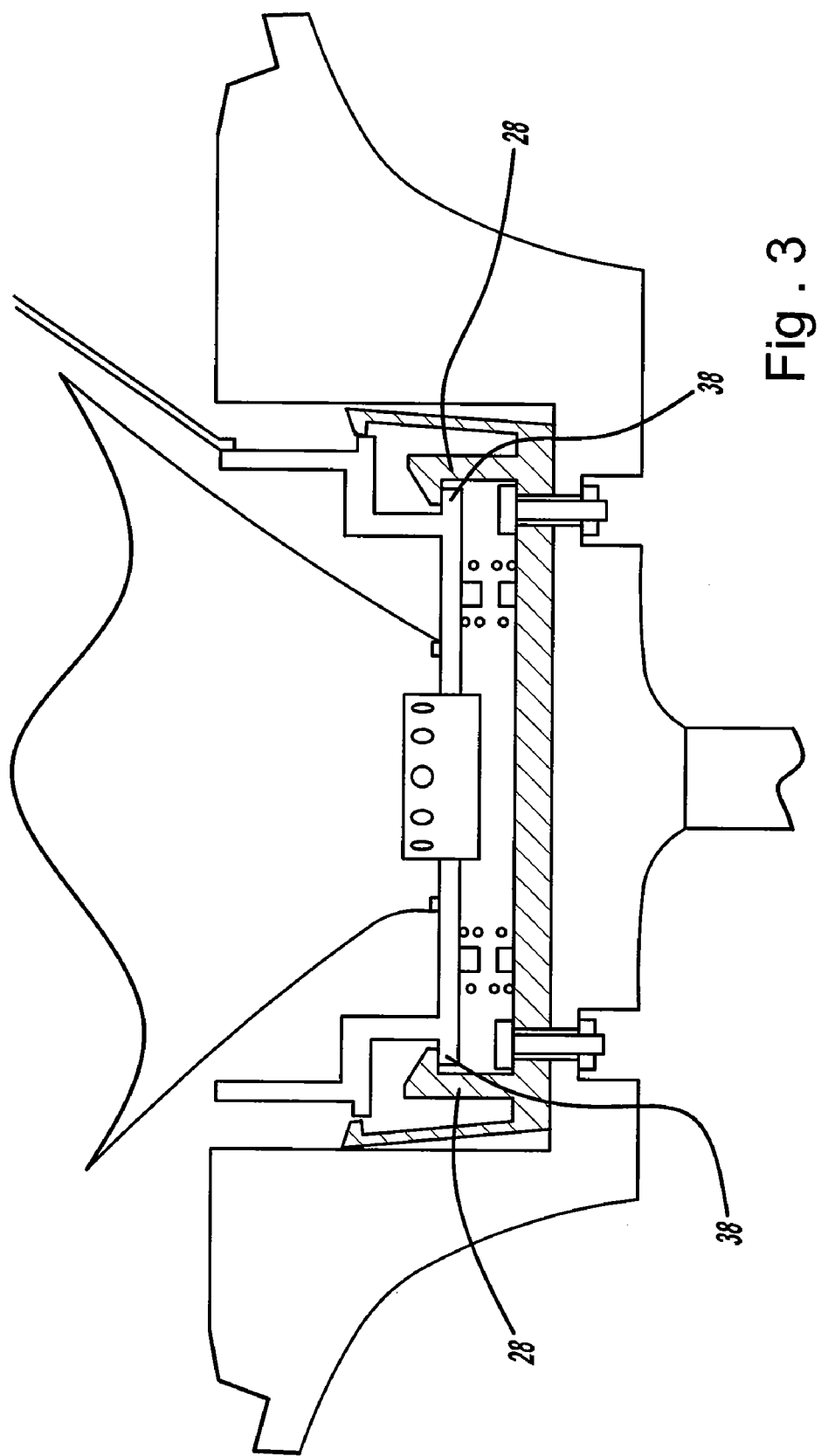
FIG. 3 shows the items shown in FIG. 1 during expansion of the airbag.

The invention will now be explained in more detail with reference to a schematic representation of FIGS. 1 to 3, and also with reference to three concrete embodiments. The basic principle, which will now be explained in more detail with reference to FIGS. 1 to 3, applies to all three embodiments.
Basic Structure FIG. 1 shows a longitudinal section through the hub area of a steering wheel unit in schematic form. This steering wheel unit exhibits a steering wheel with a steering wheel body 10, which has a recess 12 in the hub area. Spokes 14 extend from the hub area. Steering column 16 extends about centrally from the hub. The direction of extension of steering column 16 defines the axial or Z direction for what is to follow. The plane which is perpendicular to this Z direction (this plane is also perpendicular to the drawing plane of FIG. 1) is the XY plane.

On the floor of recess 12, a mounting plate 20 is screwed together with steering wheel body 10 by means of screws 22, in other words is connected to it in rigid fashion. It is also possible that the mounting plate 20 is an integral part of the steering wheel body 10; this possibility can help reduce tolerances and manufacturing costs. According to the definitions chosen in this application, mounting plate 20 and all the components which extend from it are considered to belong to the steering wheel.

An airbag module 30 is accommodated in the recess 12. This airbag module has a housing 32, an airbag 52 accommodated in housing 32, and a gas generator 54. Housing cover 50, which also belongs to the airbag module, extends over exit opening 34 of housing 32, which is opened by the expanding airbag in a known fashion.

Housing floor 32a of housing 32 is connected with mounting plate 20 by means of spiral springs 46, so that airbag module 30, and in particular also housing 32, can be pressed down against the force of these spiral springs 46 in the axial direction against the steering wheel. If airbag module 30 is pressed down far enough, horn contacts 24 and 44 are closed (see FIG. 2).

Steering wheel, airbag module and the spiral springs 46 together form the steering wheel unit.

Spiral springs 46 are naturally not able to define the position of airbag module 30 precisely in relation to the steering wheel, so that positioning means have to be provided. In total, the airbag module has 5 degrees of freedom in relation to the steering wheel (three translation degrees of freedom and two rotational degrees of freedom), so that the positioning means have to be designed accordingly. If exactly one positioning means is provided for each possible direction of movement, generally six positioning means are required. Each positioning means consists of two parts, namely a part on the steering wheel side and a part on the module side. FIG. 1 shows two positioning means, which each serve axial positioning, in other words positioning in the Z direction. Each of these axial positioning means exhibits an axial positioning hook 29 as an axial positioning means on the steering wheel side, and an axial positioning step 39 as axial positioning means on the module side. The sectional drawings only show two axial positioning means, but in practice three of these are usually present. Spiral springs 46 press housing 32 upwards and therefore press axial positioning steps 39 extending from the housing from below against axial positioning hooks 29, so that the axial position (Z position) of the module is completely defined. For operation of the horn, airbag module 30 can be pressed down exactly in axial direction as shown in FIG. 2, or it can be pressed down in tilted fashion.

The task of the axial positioning means consists solely of axial positioning, they do not have to take any large forces. From this it follows among other things that the respective components can be manufactured of plastic and in particular the axial positioning means on the module side can be manufactured in one piece with the housing.

However, when operating the gas generator, considerable forces occur, also in axial direction. Therefore retaining means are provided which hold the airbag module on the steering wheel even when, because of the high forces which occur, the axial positioning means fail, for example break (FIG. 3). The retaining means comprise retaining means on the steering wheel side, here namely retaining hooks 28, and retaining means on the module side, here namely retaining steps 38. As can be seen from FIGS. 1 and 2, the retaining means are without function in normal operating state, i.e. when no force is exercised on the airbag module from the outside (FIG. 1), or when the airbag module is pressed down in order to operate the horn, i.e. the retaining means on the steering wheel side (retaining hooks 28) and the retaining means on the module side (retaining steps 38) do not touch each other. This means that the retaining means do not enter into competition with the axial positioning means and only low requirements have to be set as regards exact dimensioning. However, it is also in particular possible, to manufacture the retaining means wholly or partially of metal.

Many advantages of the invention can only be seen with reference to the concrete embodiments, which are explained below in more detail with reference to FIGS. 4 to 18. FIGS. 4 to 11 show a first embodiment.

First Embodiment

Figure 4:
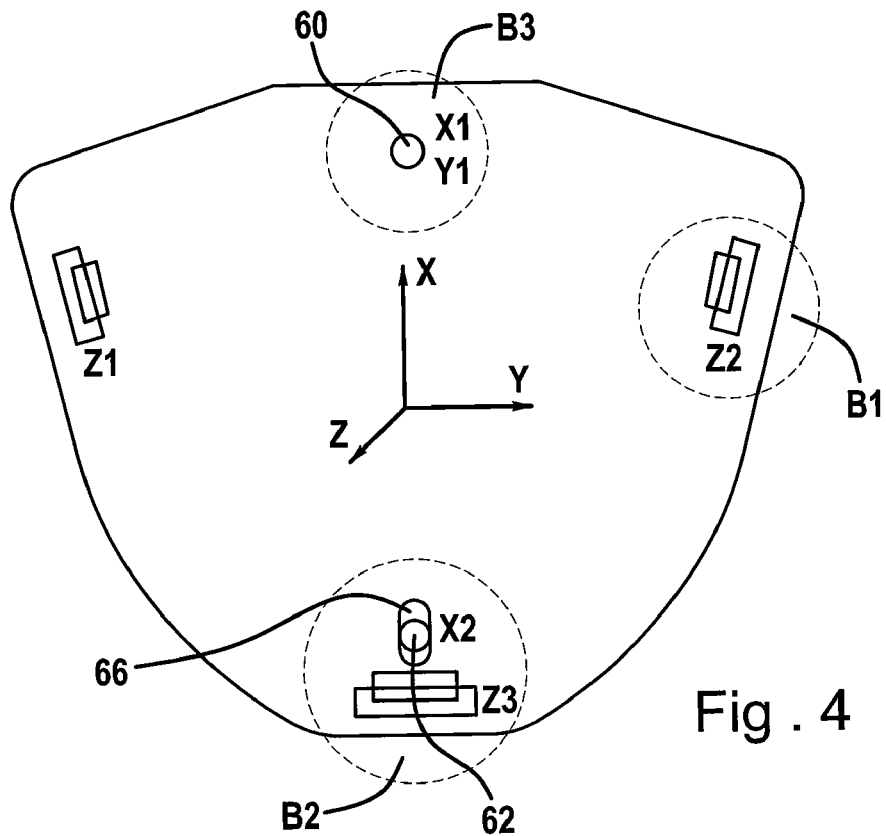
FIG. 4 is a birds-eye view of an airbag module in accordance with the present invention with a schematic representation of positioning means.
Figure 8:
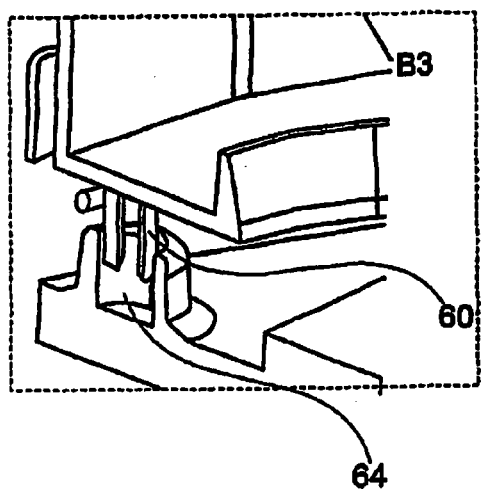
FIG. 8 shows area B3 from FIG. 4 in a view corresponding to FIG. 6.

FIG. 4 shows a birds-eye view of the airbag in a schematic form and the position and function of the individual positioning means, also in schematic form. In total, five positioning means are present, namely three pure axial positioning means, (designated with Z1 to Z3), an XY positioning means (designated with X1Y1), and also a further X positioning means (designated with X2). The X positioning means and the XY positioning means do not function in the axial direction; they are therefore designated as non-axial positioning means. The axial positioning means are in principle constructed as described above with reference to FIG. 1, as will be seen again later. The two further positioning means X1Y1 and X2 serve to define the position of airbag module 30 in the XY plane and to prevent rotation in this plane. The X1Y1 positioning means contains a first positioning peg 60 as positioning means on the module side, and a circular first positioning receptacle 64 as positioning means on the steering wheel side (FIG. 8). The X2 positioning means contains a second positioning peg 62 as positioning means on the module side as well as a oblong-shaped second positioning receptacle 66 as positioning means on the steering wheel side. The oblong shape of the second positioning receptacle 66 serves to compensate for differences in length caused by shrinkage or change in temperature.

Figure 5:
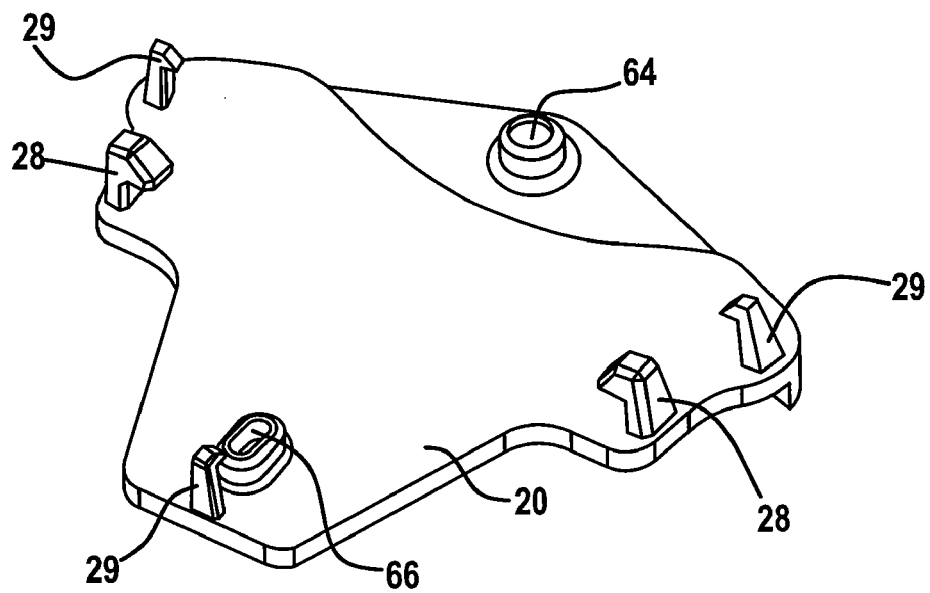
FIG. 5 shows a mounting plate.
Figure 6:
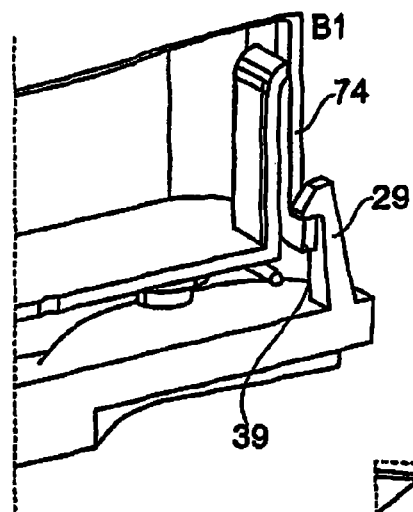
FIG. 6 shows area B1 from FIG. 4 in a detailed 3-dimensional view, when the housing is held on the mounting plate.
Figure 7:
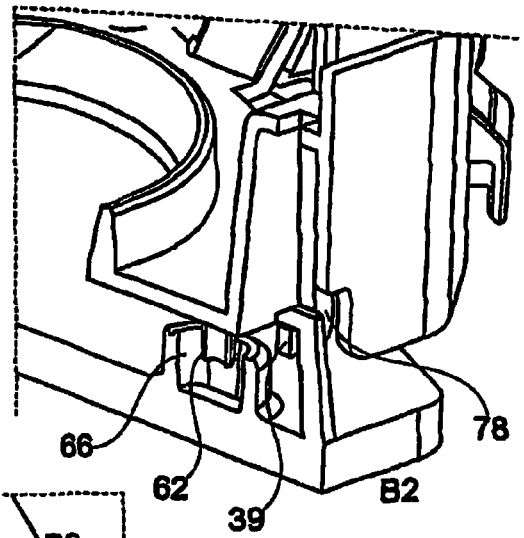
FIG. 7 shows area B2 from FIG. 4 in a view corresponding to FIG. 6.

FIG. 5 shows mounting plate 20 of the first embodiment. Here, the three axial positioning hooks 29 can be seen, which serve as axial positioning means on the steering wheel side, two retaining hooks 28, which serve as retaining means on the steering wheel side, as well as the two positioning receptacles 64 and 66. The axial positioning hooks and the retaining hooks are each formed rigidly. FIGS. 6-8 show how the positioning means on the steering wheel side work together with the positioning means on the module side. The axial positioning means on the module side are here also axial positioning steps 39, which are here the underside of U-hoops 74 and 78. Because of the mirror symmetry of airbag module 30 and mounting plate 20 (the mirror-image plane lies in the XZ plane), the two hoops which belong to the Z1 or Z2 axial positioning means are designated as first U-hoops 74, and the U-hoops belonging to axial positioning means Z3 are designated as second U-hoop 78.

Figure 9:
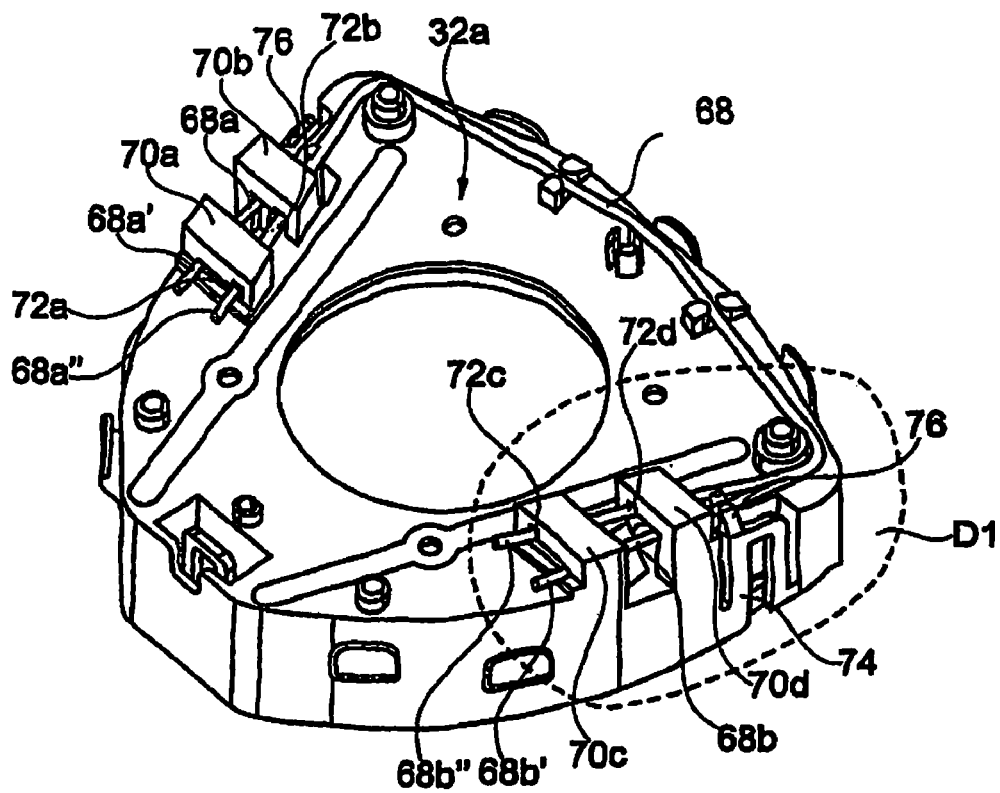
FIG. 9 is a 3-dimensional view of the housing from below, whereby an omega spring is fixed on the floor of the housing and two positions of the omega spring are shown.
Figure 10:
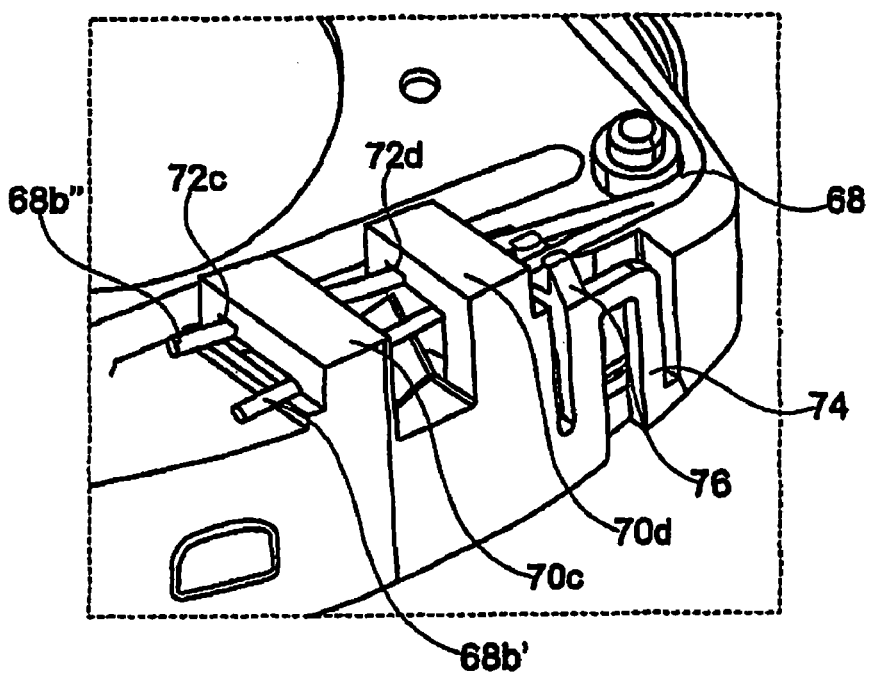
FIG. 10 shows detail D1 from FIG. 9.
Figure 11:
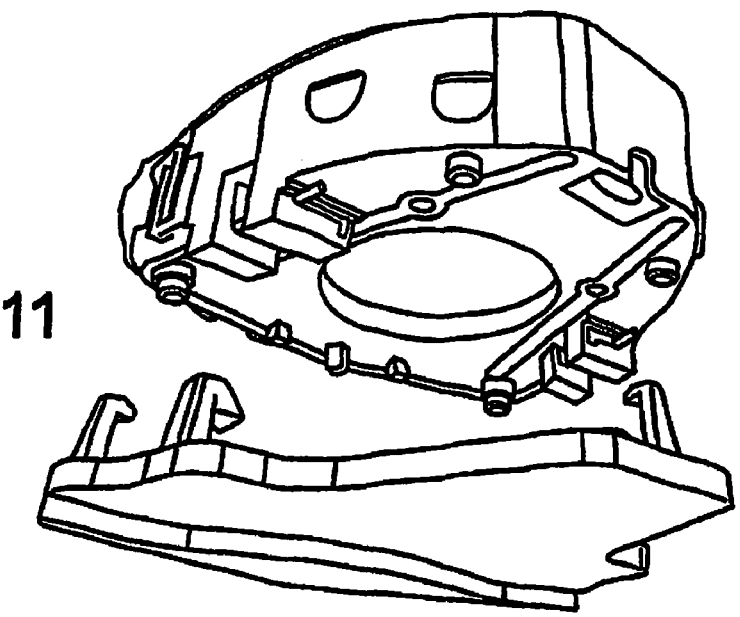
FIG. 11 shows the housing of FIG. 9 and the mounting plate of FIG. 5.

The form of the retaining means on the module side will now be described with reference to FIGS. 9 and 10. A spring wire is held on the housing floor 32a, which because of its form is referred to as omega spring 68. The end sections 68a and 68b of this omega spring 68 are each held by two retaining blocks 70a to 70d, whereby each of these retaining blocks 70a to 70d exhibits a groove 72a to 72d. This groove is on the inner side in each case, so that end sections 68a, 68b of omega spring 68 can take up two positions, namely an outer position 68a', 68b', which corresponds to the locked state, and an inner position 68a" and 68b", which corresponds to the unlocked state as is shown in FIG. 9.

Immediately behind retaining blocks 70b and 70d omega spring 68 is on both sides guided through a U-shaped transfer element 76, each of which extend from a first U-hoop 74. This means that when an end section of the omega spring 68 is swivelled from the outer to the inner position, the relevant axial positioning step of the corresponding U-hoop 74 is swivelled inwards. Transfer element 76 is formed in one piece with the first U-hoop 74, which for its own part is formed in one piece with housing 32. Housing 32 is an injection moulded part of plastic, or has a core made of metal with a plastic overmolding.

During mounting of the airbag module, the module is introduced into the recess of the steering wheel body from above (FIG. 11), whereby the end sections of omega spring 68 are in their outer position. In this position, these are pressed somewhat inwards by the slanting heads, of retaining hooks 28, but not so far that they can snap into grooves 72a to 72d of retaining blocks 70. This means that after completion of the mounting process, they snap back into their outer position. In the same way, the axial positioning steps 39 of U-hoops 74 and 78 are pressed inwards lightly by the heads of axial positioning hooks 29, also formed at a slant, and snap back into their force-free initial position following completion of the mounting process. In the mounted state, when the horn is not pressed down, axial positioning hooks 29 lie against axial positioning steps 39 (which are parts of the U-hoops), while the retaining hooks and the end sections of omega spring 68 (which forms the retaining means on the module side) do not touch each other. This means that the axial position (Z position) of the module is only determined by the axial positioning hooks and the axial positioning steps. However, when the gas generator is operated, with resulting forces, the axial positioning hooks and/or hoops 74 and 78 can break. In this case, retaining hooks 28 together with omega spring 68 prevent the airbag from separating from the steering wheel.

If airbag module 30 is to be removed from the steering wheel, the end sections of omega spring 68 are brought into the inner position with a tool, so that they snap into grooves 72. In this position, they lie so far to the inside, that they can no longer engage with retaining hooks 28 (unlocked position). During this movement, the end sections of omega spring 68 also swivel axial positioning steps 39 of first U-hoop 74 towards the inside (which is the purpose of transfer elements 76). In this position, the corresponding axial positioning steps 39 also lie so far to the inside that they can no longer engage with axial positioning hooks 29 (unlocked state), so that airbag module 30 can be pulled out upwards. As the second U-hoop 78 is not swivelled into a removal position, it is necessary to tilt the airbag module slightly when lifting it out. The oblong shape of the second positioning receptacle 66 makes this tilting possible. Thus, the oblong shape of this second positioning receptacle 66 has two purposes: It serves for the compensation of differences in length due to temperature change or shrinkage as well as for making the tilting possible which is needed during disassembly.

The one-pieced omega spring is preferred solution. But it has to emphasised that it is also possible to have two separate spring wires, one for each side of the module.

Second Embodiment

Figure 12:
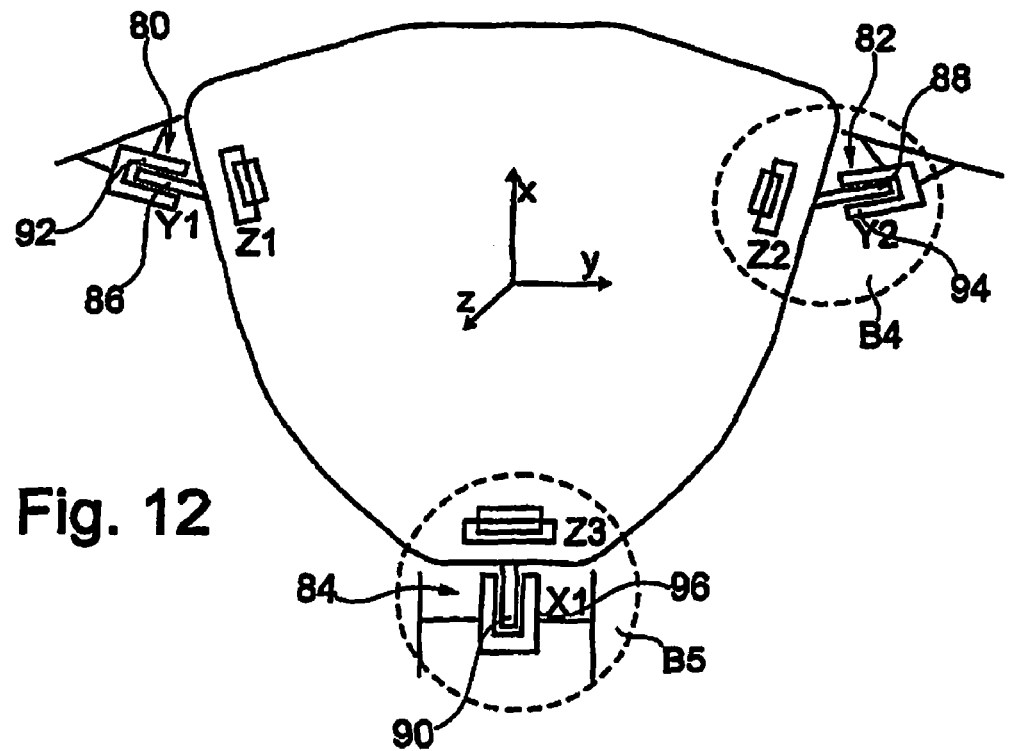
FIG. 12 is a birds-eye view of the airbag module according to a second embodiment of the invention in a view corresponding to FIG. 4 with schematic representation of the positioning means.
Figure 13:
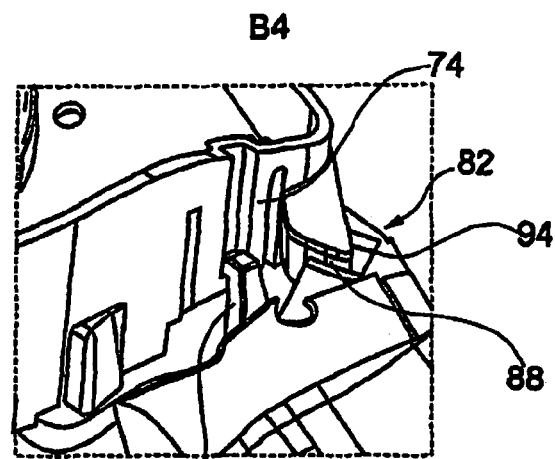
FIG. 13 shows area B4 of FIG. 12 in a view corresponding to FIG. 6.
Figure 14:
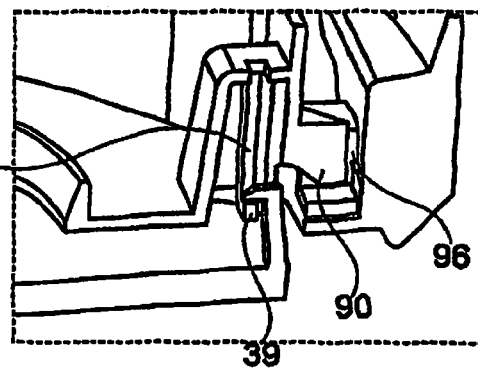
FIG. 14 shows area B5 in a view corresponding to FIG. 13.
Figure 14B:
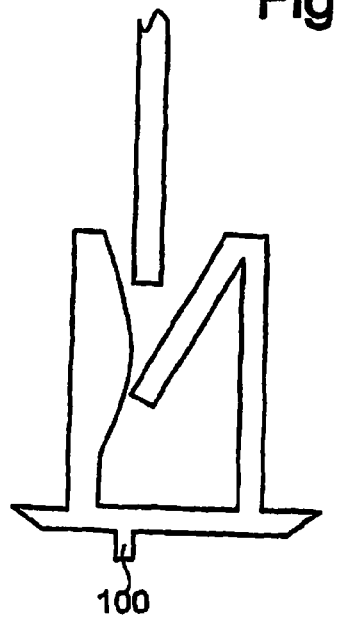
FIG. 14b shows the items shown in FIG. 14a in non-assembled state.
Figure 14A:
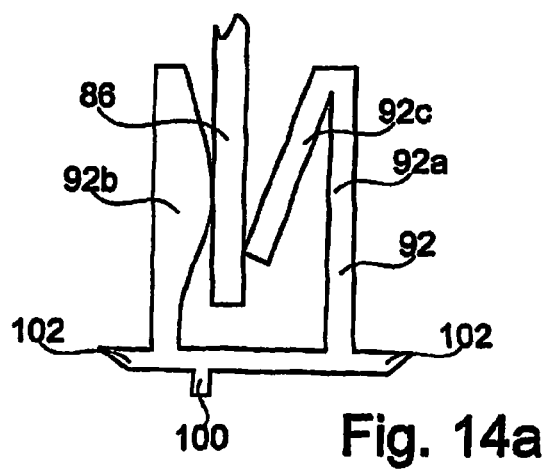
FIG. 14a shows a positioning means lying on the outside in assembled state.
Figure 15:
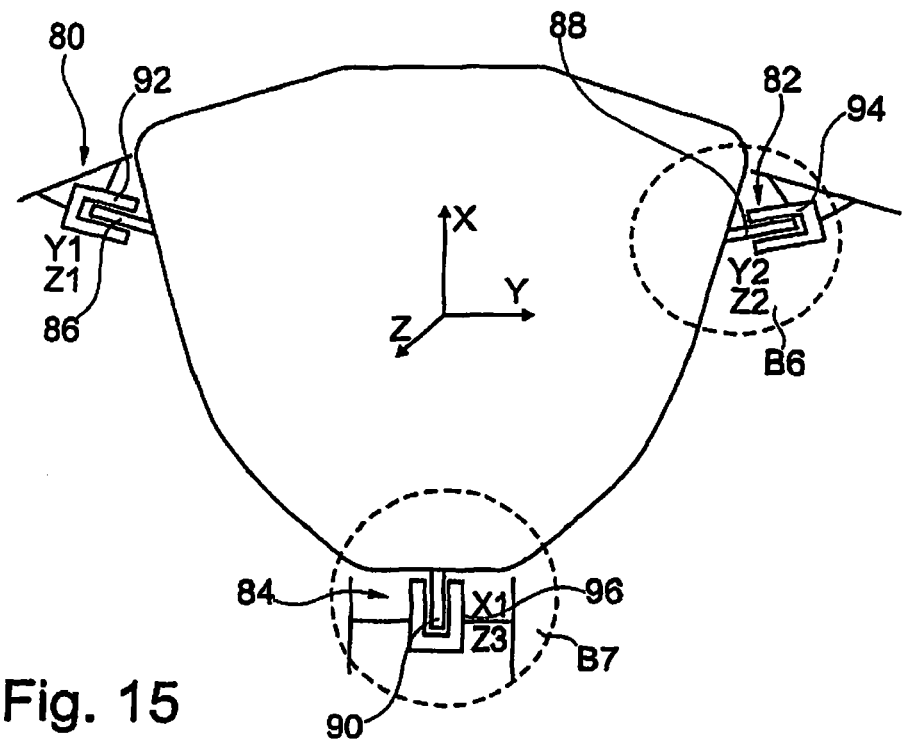
FIG. 15 shows a third embodiment of the invention in a view corresponding to FIG. 12.

FIGS. 12 to 14 show a second embodiment of the invention. The retaining means and the axial positioning means are identically formed to those in the first embodiment and they are therefore not described again here. In contrast to the first embodiment, positioning in the XY plane is achieved by means of outer positioning means 80, 82, and 84. On the module side, these comprise plate-formed sections 86, 88, and 90 and on the steering wheel side suitable receiving elements 92, 94, and 96. Such a plate-shaped section 86 and a receiving element 92 in mounted state are shown in FIG. 14a as a section. The receiving element has a basically U-shaped cross-section, whereby from an upper end of a first leg 92a an elastic arm 92c extends into the inside of the U. The inner side of second leg 92b lying opposite first leg 92a is convex in form. The minimum distance between the elastic arm and the second leg is, when in force-free condition, smaller than the thickness of the plate-shaped section, so that in mounted condition the plate-shaped section is pressed on the second leg, which leads to positional fixing in the XY plane (FIG. 14b).

The receiving elements 92, 94, and 96 are preferably separate elements of plastic, which are located into recesses provided for this purpose in the steel wheel body by means of a form fit. The elements serving for the form fit are the side projections 102. An off-centred peg 100 is provided on the bottom leg of the U-shaped receiving element making sure that the receiving element can only be inserted into the respective recess in its correct orientation.

Third Embodiment

FIGS. 15 to 20 show a further embodiment, which is similar to the second embodiment. In contrast to the second embodiment, here the outer positioning means 80, 82, and 84 also serve for positioning in Z direction (axial direction). In order to achieve this, the lower ends of plate-shaped sections 86, 88, and 90 comprise hook sections 88a and 90a (FIGS. 16 and 17), so that the hooks sections formed in this way are pressed against the lower faces of the elastic arms 94c and 96c because of the force of the spiral springs (horn springs). During mounting of the airbag module in the steering wheel, the arms are first pressed to the side by means of the hook-shaped ends of the plate-shaped sections, and then snap back.

As it is not possible to unlock the Z positioning using the omega spring, the receiving elements 92, 94, and 96 are held in the steering wheel body in such a way that they can be removed from the steering wheel body for example by pushing them to the inside, so that the positioning means are decoupled. It is also possible that the steering wheel body is somewhat elastic (for example by using a foam material) in the area of the recesses in which the receiving elements 92, 94, and 96 are held. In this case the receiving elements can be snapped out of the steering wheel body for disassembly purposes by pushing them in Z-direction. Before a new assembly, they have to be snapped into the foam again.

Figures 16, 17:
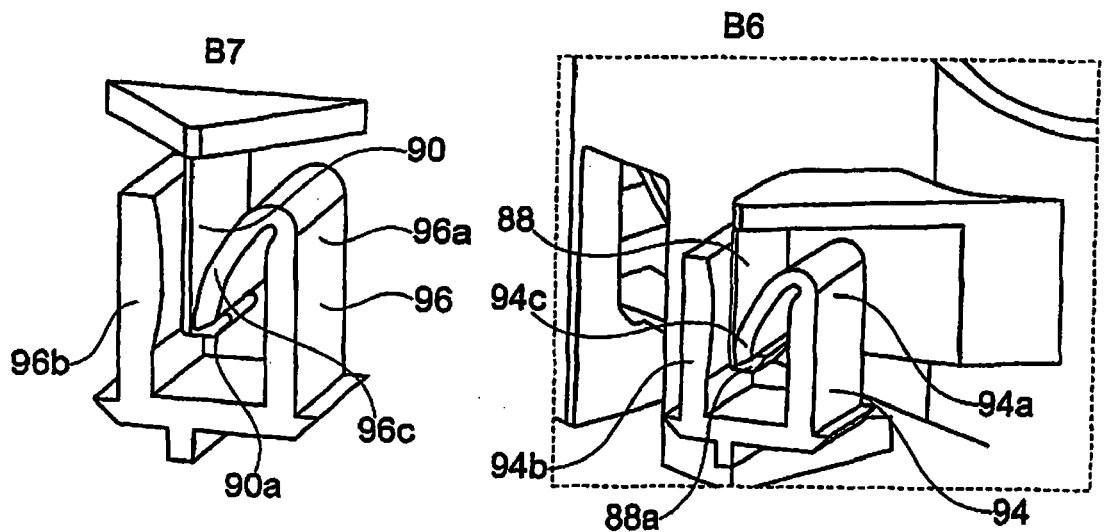
FIG. 16 shows area B6 from FIG. 15 in a view corresponding to FIG. 13.
FIG. 17 shows area B7 from FIG. 15 in a view corresponding to FIG. 13.
Figure 18:
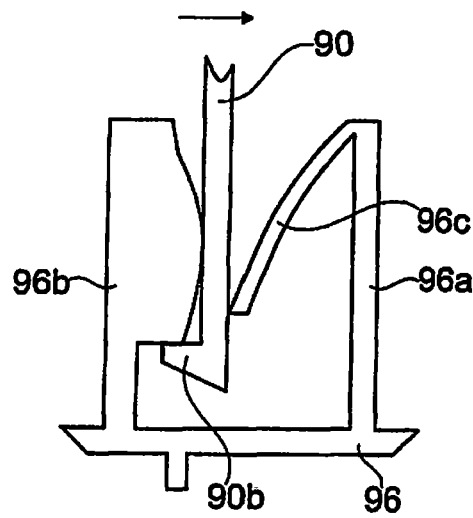
FIG. 18 shows a variant of the items shown in FIG. 17.
Figure 19:
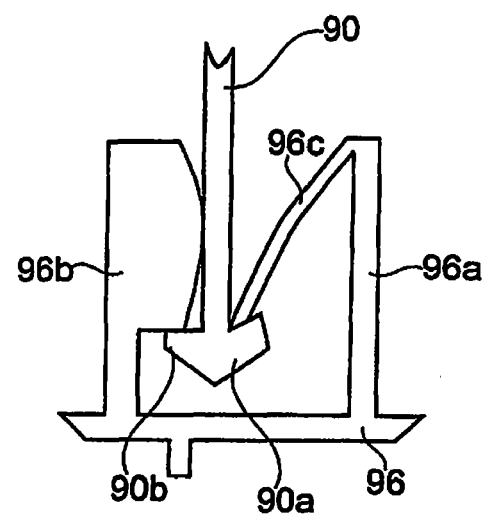
FIG. 19 shows a further variant of the items shown in FIG. 17.

FIGS. 18 and 19 show variants of what is shown in FIG. 17. In the variant of FIG. 18 the hook section 90*b* of the plate-shaped section 90 point towards the second leg 96*b* of the receiving element 96 which shows a step. The advantage of this variant is that it is possible to desnap the hook sections by a combined turning (see arrow in FIG. 18) and pulling operation (provided all pairs of plate shaped sections and receiving elements in the steering wheel unit have the same orientation, which is preferred).

In the variant of FIG. 19 the plate shaped-section has hook sections 90*a* and 90*b* on both sides. This configuration makes it easier to pull the receiving elements out of a foam core of the steering wheel body since the pulling force which is exerted to the housing is transferred to the receiving elements more symmetrically.

If a solution is chosen in which at least one hook section 90*a* of the plate-like section points into the direction of the elastic arm 96*c*, it is preferred that the upper surface of this hook section 90*a* extends slanting upward from the plate-like section 90 as can be seen in the FIGS. 16, 17 and 19. The lower face of the elastic arm 96*c* should follow this slant. In this design the force of the horn springs help the elastic arm being pressed against the plate-like section 90. In this case the clamping force eliminates any gap between the plate-like section and the receiving element. This is very useful to avoid noises during vibration load.

The FIGS. 18 and 19 show the third plate-like section 90 and the third receiving element 96, but it is clear that this is only chosen as an example. The first and the second plate-like section and the first and the second receiving element can be made the same way. A mixing of the described variants in a single steering wheel unit would generally be possible but is usually not preferred.

Figure 20:
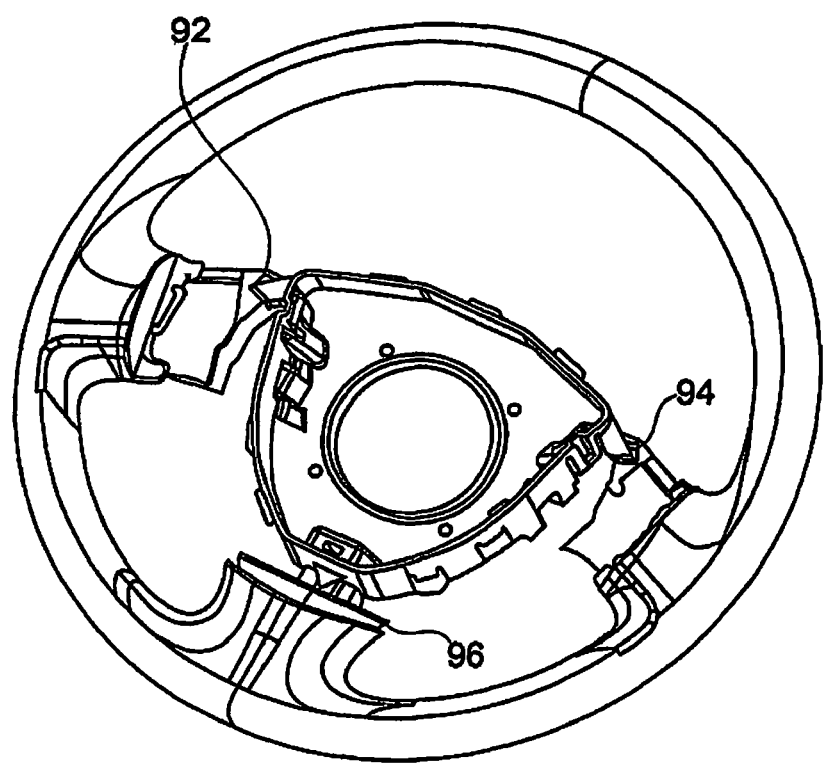
FIG. 20 shows the airbag module from FIG. 15, which is accommodated in a steering wheel body, whereby the steering wheel body is shown in a form in which it is cut open.

The FIG. 20 shows the arrangement of the receiving elements in the steering wheel body. The retaining means have the same shape as in the first two embodiments, therefore basically consist of an omega spring as retaining means on the module side and retaining hooks as retaining means on the steering wheel side.

All shown embodiments have the advantage that rattling sounds are widely avoided since the metallic spring wire (the omega spring) is in normal operation conditions not in contact with the steering wheel body.

While the above description constitutes the preferred embodiment of the present invention, it will be appreciated that the invention is susceptible to modification, variation, and change without departing from the proper scope and fair meaning of the accompanying claims.

The invention claimed is:

1. A steering wheel unit for a motor vehicle with a steering wheel and an airbag module (30) located in the hub area of the steering wheel, the airbag module having a housing (32), an airbag (52) folded into the housing, and a gas generator (54), whereby the airbag module can be pushed down against the force of at least one spring element to activate a horn, the steering wheel unit comprising positioning means for defining the position of the airbag module in relation to the steering wheel, and retaining means (28;38,68) for acting between the airbag module and the steering wheel, the retaining means comprising a first retaining element connected to the steering wheel and a second retaining element connected to the airbag module, the first retaining element and the second retaining element being in mechanical contact and holding the airbag module at the steering wheel upon failure of the positioning means caused by a deployment of the airbag, and the first retaining element and the second retaining element being not in mechanical contact with each other in the absence of forces caused by the deployment of the airbag and when the airbag module is pushed down.

2. A steering wheel unit according to claim 1, wherein the housing has a floor and the retaining means further comprise at least one spring wire element held on the floor of the housing.

3. A steering wheel unit according to claim 2, further comprising that the spring wire element is in the form of a single one-piece spring wire.

4. A steering wheel according to claim 3 further comprising that the spring wire element has a horseshoe or an omega shape.

5. A steering wheel unit according to claim 2 further comprising that the spring wire element has two free ends (68*a*, 68*b*).

6. A steering wheel unit according to claim 5 further comprising that each of the free ends (68*a*,68*b*) of the spring wire element is configured to adopt a defined inner and a defined outer position, whereby one of the inner and outer positions corresponds to a locked state and the other one of the inner and outer positions corresponds to an unlocked state.

7. A steering wheel unit according to claim 6, wherein the positioning means has at least one positioning element attached to the airbag module, the steering wheel unit further comprising at least one transfer element (76), which transfers the unlocked state of at least one end of the spring wire element to the at least one positioning element.

8. A steering wheel unit according to claim 1, the positioning means comprising a purely axial positioning element for positioning the airbag module axially with respect to the hub area and a purely non-axial positioning positioning element for positioning the airbag module non-axially with respect to the hub area.

9. A steering wheel unit according to claim 8, further comprising that the purely axial positioning element is attached to the airbag module and formed as a U-hoop (74,78).

10. A steering wheel unit according to claim 8 further comprising that the purely non-axial positioning element includes at least one receiving element (92,94,96), which is held on the steering wheel so as to create a form fit.

11. A steering wheel unit according to claim 10, further comprising that the at least one receiving element (92,94,96) forms a U-shaped profile, whereby an elastic arm (92*c*) extends from an upper end of a first leg (92*a*) into the inside of the U-shaped profile.

12. A steering wheel unit according to claim 1 further comprising that the positioning means includes a positioning element that provides both axial and non-axial positioning of the airbag module with respect to the hub area.

13. A steering wheel unit according to claim 12, further comprising that the positioning means include at least one receiving element (92,94,96) which is held on the steering wheel by means of a form fit and that the positioning element is connected to the airbag module and comprises at least one hook section (88a,90a,90b).

14. A steering wheel unit according to claim 13, further comprising that the at least one receiving element (92,94,96) forms a U-shaped profile, whereby an elastic arm (94c,96c) extends from an upper end of a first leg (94a,96a) into the inside of the U-shaped profile.

15. A steering wheel unit according to claim 14, further comprising that only one of the at least one hook section (90b) is present which points towards the second leg (96b) of the U-shaped profile.

16. A steering wheel unit according to claim 14, further comprising that the at least one hook section (90a) is present which points towards the elastic arm (94c,96c) of the U-shaped profile.

17. A steering wheel unit according to claim 16, further comprising that the upper surface of the at least one hook section (88a,90a) is a slant rising towards the first leg (94a, 96a) of the U-profile.

18. A steering wheel unit according to claim 16, further comprising that two hook sections (90a,90b) are present.

19. A steering wheel unit according to claim 10 further comprising that the at least one receiving element (92,94,96) is detachably held to the steering wheel (10).

20. A steering wheel unit according to claim 19, further comprising that the at least one receiving element (92,94,96) can be snapped out from the steering wheel (10).

\* \* \* \* \*